United States Patent Office 2,771,272
Patented Nov. 20, 1956

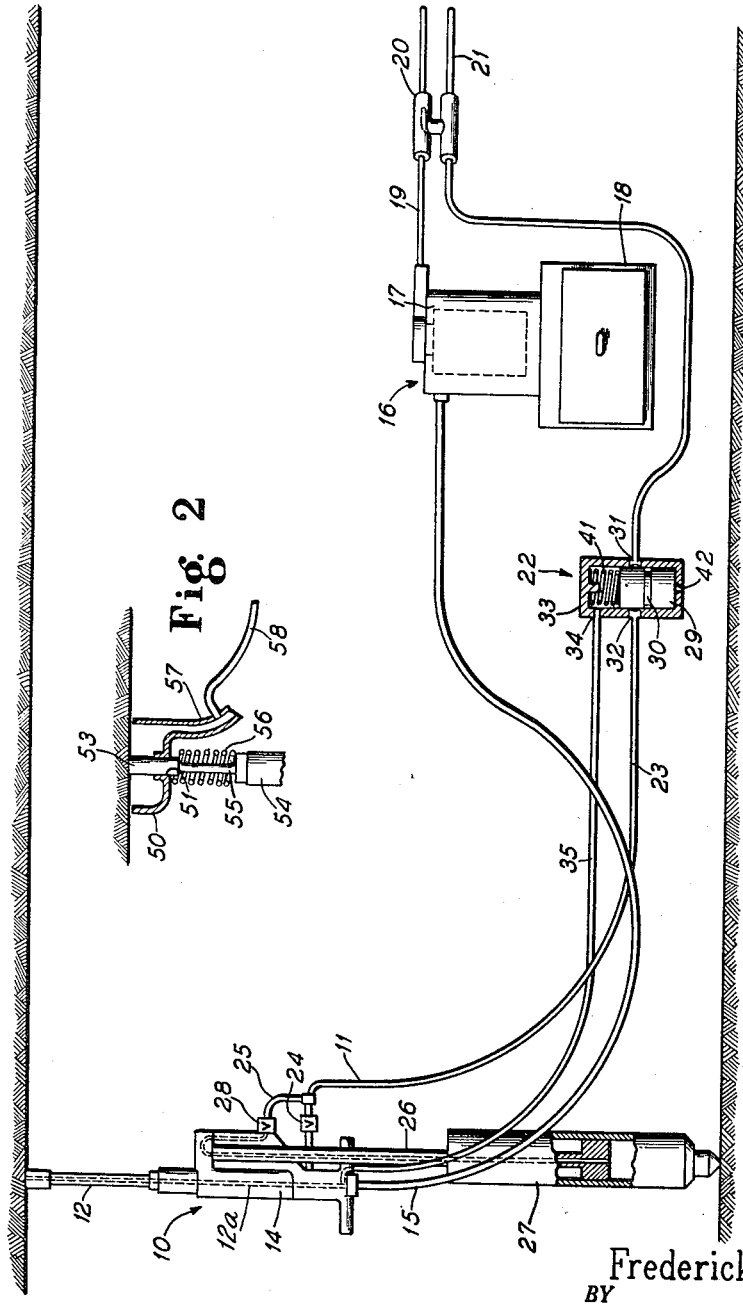

2,771,272

DRILLING SYSTEM

Frederick B. Miller, Chicago, Ill., assignor to Goodman Manufacturing Company, Chicago, Ill., a corporation of Illinois Application October 26, 1954, Serial No. 464,801

3 Claims. (Cl. 255—50)

This invention relates to improvements in fluid pressure operated rock drills having dust evacuating means associated therewith for receiving dust and cuttings from a hole being drilled.

In devices of the character described it is advantageous to have a light portable drill so that it may be readily positioned by the operator. The dust collecting means, of necessity being rather heavy and bulky, is, therefore, usually mounted on a compressor truck some distance away from the operator, the compressor serving as the source of fluid pressure for the drill. Because the dust collector unit is located at some distance from the operator, it is difficult for the operator to ascertain when the dust collector is in need of emptying. If the dust collector should become too full, or if an obstruction or excessive accumulation of dust should occur in any of the dust removal lines, or if a leak should develop in the dust removal system, the flow of air through the dust evacuating line would be reduced. This would impair the efficiency of the dust removal system and thereby reduce the drilling rate since the drill operates most efficiently when the dust is being removed as fast as it is created. A full air flow through the dust evacuating system is also desirable for the added cooling effect of the air on the drill bit, a reduction in operating temperature of the bit resulting in a distinct increase in the service life of the bit.

The principal object of the present invention is to provide an improved fluid pressure system for devices of the character described having means responsive to either excessive accumulations in the dust evacuating part of the system, or to air leaks in said system, for automatically shutting off the flow of operating fluid to the rock drill as a warning to the operator that the dust evacuating part of the system is impaired.

Other objects and advantages of the invention will appear from time to time as the following description proceeds.

The invention may best be understood by reference to the accompanying drawings in which:

Figure 1 is a diagrammatic view showing a fluid pressure rock drilling system constructed in accordance with my invention;

Figure 2 is a fragmentary sectional view showing a modified form of dust receptacle which may be used in conjunction with the system of my invention.

Referring now to details of the embodiment of my invention illustrated in the drawings, Figure 1 shows diagrammatically a rock drill, indicated generally at 10, of a more or less conventional type, adapted for operation by fluid or pneumatic pressure from a pressure line 11. The illustrative form of drill shown is of the hollow shank type such as is shown in the copending application of Holman, Oram and James, bearing Serial Number 232,172, now abandoned, having as one of its characteristic features dust receptor means comprising a hollow drill shank 12, through which the dust and cuttings from the drill hole are received and carried away by suction through a hollow central eductor line passage 12a in the body of pneumatic drill 14 to a suction line 15 and, from thence, to a dust collector unit 16. The dust collector may be of any suitable construction such as that disclosed in the copending application of George W. Miller, Serial Number 367,013.

In the form of dust collector shown diagrammatically, the upper casing 17 may consist of a separating chamber while the lower portion 18 includes a removable receptacle for accumulated dust which is more or less conventional in devices of this kind.

A suction line 19 is connected to the dust collector casing 17 and leads to an evacuating means 20 which may be any type of vacuum pump, the form shown consisting of an air-injector device of conventional design, operated by pressure from a fluid pressure line 21. Said fluid pressure line is connected to a suitable source of pressure (not shown) and leads to one side of an automatic control valve 22. From the other side of the automatic control valve, the portion 23 of fluid pressure line 21 leads to the drill body 14 for actuating the drill in the usual manner. A manual control valve, indicated generally at 24, is provided as usual on the drill body for controlling the operation of the latter. In the form shown diagrammatically in Figure 1, the pressure line 23 has a branch line 25 leading to a conventional holding post 26 for the pneumatic drill 14, which holding post includes a pressure operated jack 27 for engagement with the floor. The branch pressure line 25 to the jack 27 preferably is provided with a check valve 28 therein, to hold the jack when pressure in line 23 is temporarily relieved. Further details of construction of the drill actuating mechanism and the holding post need not be shown or described herein, as they form no part of the present invention.

The automatic control valve 22 consists of a movable member 29, herein of the spool type, having an annular groove 30 thereabout adapted for movement into and out of registering relation with opposed inlet and outlet ports 31 and 32 in the casing 33 of said automatic control valve. A suction control line 35 connects a port 34 in the upper end of the casing 33 to a suitable point in the dust suction line in or adjacent the rock drill 14, which connection point, in the illustrative form shown herein, is made with the suction line 12a near the lower end of the rock drill 14. In any case, it can be said that the suction control line 35 is connected to the dust suction line adjacent the dust receptor end of the latter. A port 42 in the lower end of casing 33 is open to the atmosphere.

The valve spool 29 of control valve 22 is normally under a light biasing effect of a spring 41 in the upper end of casing 33 permitting the groove 30 to register with the ports 31 and 32 when the suction effective from the dust suction line through the suction control line 35 is at a normal operating value, sufficient to overcome the biasing effect of the spring, but said spring being effective to urge the valve spool 29 toward closed position shown in Figure 1 when the suction in the dust suction line 15 drops below a predetermined value for any reason.

The modified form of dust collector means, shown in Figure 2, consists of a bowl type collar 50 having an axial opening 51 therethrough, through which the drill head 53 of a power drill 54 is slidably projected. With this form of device, the drill head 53 of the shank 55 may be solid instead of hollow as shown in connection with the form of drill illustrated in Figure 1. The collar 50 is adapted to be retained in close juxtaposition to the roof by a coil spring 56 surrounding the drill shank 55. The collar 50 is connected to a suction line corresponding to the line 15 of Figure 1 by an outlet 57. A suction control line 58 corresponding to the line 35 of Figure 1 is connected to outlet 57. It will be understood that, with the form of collector means shown in Figure 2, the power drill 54 will also be connected to a pressure line corresponding to the line 23 shown in Figure 1.

The use and operation is as follows:

During normal operation of the pneumatic drill 14 (or 54), operating pressure is supplied to the drill through the pressure line 23. If the suction line 15 of the dust evacuating system between the drill 14 and the injector 20 is unobstructed, and has no leaks, so as to permit a normal flow of air through said dust evacuating system for removing dust from the hole produced by the drill, it will be understood that, by reason of the normal restriction in air flow as it passes through the drill 14 and the drill shank 12 there will be created a reduced pressure condition in line 15 at the lower end of the drill 14, such reduced pressure condition (or suction) operating to move the valve spool 29 upward against the biasing spring 41, so that the valve spool 29 is normally held in its open position with respect to the inlet and outlet ports 31 and 32 of the pressure control valve 22 to supply operating pressure to the drill.

In the event that the dust evacuating line 15 should become clogged or obstructed, or should develop a leak, so as to cause a substantial reduction in flow of air through said suction line and the dust collector, it will be understood that the vacuum in said dust suction line will be reduced at the point where the control line 35 is connected thereto. In either case, the corresponding reduction of vacuum in the control line will permit the biasing spring 41 to shift the spool 29 downwardly to the position substantially shown in Figure 1, thus closing off the supply of operating pressure through line 23 to the drill. As a result, the operator will be automatically warned that there is either an obstruction or a leak in the dust suction line 15 or in the dust collector 16 tending to impair the proper operation of the dust removing part of the system. Accordingly, he will be unable to resume operation of the drill until the cause of the obstruction or leak is found and corrected.

Although I have shown and described certain embodiments of my invention it will be understood that I do not wish to be limited to the exact construction shown and described, but that various changes and modifications may be made without departing from the spirit and scope of the invention as defined in the appended claims.

I claim:

1. In a drilling system employing a fluid-pressure actuated rock drill, a flexible pressure conduit adapted to supply actuating fluid to said rock drill, dust receptor means carried by said rock drill for receiving cuttings and dust from a hole being drilled, a suction source, a flexible dust suction line connecting said receptor means and said suction source and having filter means therein, a valve means in said pressure conduit, said valve means including a movable member movable between a first position wherein said movable member prevents flow through said pressure conduit and a second position wherein said movable member permits flow therethrough, means for moving said movable member to said second position including a flexible suction control line fluidly connecting said valve means to said dust suction line adjacent the dust receptor means, and resilient means in said valve means responsive to a predetermined suction in said suction control line for maintaining said movable member in said second position, said resilient means being effective under a reduction of suction in said dust suction line through said suction control line to move said movable member toward said first position.

2. In a drilling system employing a fluid-pressure actuated rock drill, a flexible pressure conduit adapted to supply actuating fluid to said rock drill, dust receptor means carried by said rock drill for receiving cuttings and dust from a hole being drilled, a suction source, a flexible dust suction line connecting said receptor means and said suction source and having filter means therein, a valve means in said pressure conduit, said valve means including a movable member movable between a first position wherein said movable member prevents flow through said pressure conduit and a second position wherein said movable member permits flow therethrough, biasing means urging said movable member toward said first position, means for moving said movable member to said second position against the urgence of said biasing means including a flexible suction control line fluidly connecting said valve means to said dust suction line adjacent the dust receptor means, said movable member being responsive to a predetermined suction in said suction control line to move toward said second position, said biasing means moving said movable member to said first position in response to a reduction of said predetermined suction in said suction control line.

3. The structure set forth in claim 2 wherein said valve means comprises a casing having inlet and outlet ports therein and said movable member is disposed within said casing, said movable member being of the spool type and having an annular groove intermediate the ends thereof, said groove being in registration with said ports when said movable member is in said second position and in non-registration therewith when said movable member is in said first position.

References Cited in the file of this patent

FOREIGN PATENTS

| 409,657 | Italy | Feb. 27, 1945 |
| 410,577 | Italy | Apr. 17, 1945 |